(12) United States Patent
Liang et al.

(10) Patent No.: US 11,485,055 B2
(45) Date of Patent: Nov. 1, 2022

(54) MOLDING PROCESS OF CO-CURED SHORT-FIBER RESIN-BASED DAMPING COMPOSITE MATERIAL AND MOLDING PART

(71) Applicant: QINGDAO UNIVERSITY OF TECHNOLOGY, Shandong (CN)

(72) Inventors: Sen Liang, Qingdao (CN); Gongxian Yang, Qingdao (CN); Yunpeng Yan, Qingdao (CN); Guanghe Wang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 175 days.

(21) Appl. No.: 16/985,591

(22) Filed: Aug. 5, 2020

(65) Prior Publication Data
US 2021/0039285 A1 Feb. 11, 2021

(30) Foreign Application Priority Data
Aug. 7, 2019 (CN) .......................... 201910726842.8

(51) Int. Cl.
*B29C 41/00* (2006.01)
*B29C 33/58* (2006.01)
(Continued)

(52) U.S. Cl.
CPC ............ *B29C 41/003* (2013.01); *B29C 33/58* (2013.01); *B29C 41/04* (2013.01); *B29C 41/22* (2013.01);
(Continued)

(58) Field of Classification Search
None
See application file for complete search history.

(56) References Cited

U.S. PATENT DOCUMENTS

2004/0010085 A1* 1/2004 Hall ........................ C08L 51/04
525/192
2014/0199551 A1* 7/2014 Lewit ................... C08G 18/683
523/400

(Continued)

FOREIGN PATENT DOCUMENTS

CN 102179978 A * 9/2011

OTHER PUBLICATIONS

Adesina, A. S. et al.,: Technology Adaptation: Design of Centrifugal Casting Head; Journal of Engineering and Applied Science, vol. 4, Sep. 2012, p. 63-68 (Year: 2012).*

*Primary Examiner* — Mohammad M Ameen
(74) *Attorney, Agent, or Firm* — Oliff PLC

(57) ABSTRACT

A molding process of a co-cured short-fiber resin-based damping composite material and a molding part. Different from a traditional centrifugal processing process of a thin-walled tube of a resin-based composite material, the process uses raw materials including three kinds of materials with different densities and including two kinds of short-fiber epoxy resin with different densities and a damping material. During centrifugal molding, the three kinds of materials are made into fluids to be respectively injected at a uniform speed in three times according to the sizes of the densities. Layering is performed by using different centrifugal forces applied to the three kinds of materials. Co-curing is performed according to a resin curing process after the three kinds of materials are stably distributed, and a tubular thin-walled part of the embedded co-cured short-fiber resin-based damping composite material with a uniform wall thickness is obtained.

7 Claims, 3 Drawing Sheets

(51) Int. Cl.
    *B29C 41/04*     (2006.01)
    *B29C 41/22*     (2006.01)
    *B29C 41/46*     (2006.01)
    *C08J 5/00*     (2006.01)
    *B29K 63/00*     (2006.01)
    *B29K 105/12*     (2006.01)
    *B29L 9/00*     (2006.01)

(52) U.S. Cl.
    CPC .................. *B29C 41/46* (2013.01); *C08J 5/00* (2013.01); *B29K 2063/00* (2013.01); *B29K 2105/12* (2013.01); *B29L 2009/00* (2013.01); *C08J 2363/00* (2013.01)

(56) References Cited

U.S. PATENT DOCUMENTS

2016/0001532 A1*   1/2016   Maziers .................. B29C 41/20
                                                                                     428/318.6
2017/0016503 A1*   1/2017   Teshima .................. B60R 19/34

* cited by examiner

MOLDING PROCESS OF CO-CURED SHORT-FIBER RESIN-BASED DAMPING COMPOSITE MATERIAL AND MOLDING PART

BACKGROUND

Technical Field

The present invention relates to a centrifugal molding method of an embedded co-cured short-fiber resin-based damping composite material and a molding part, and belongs to the field of study of functional composite materials.

Related Art

Materials are the basis of the development of science and technology. Resin-based composite materials, as a great class of first developed novel materials, have achieved a great promotion effect on the development of the science and technology, particularly in the field of aerospace. With the rapid development of the space technology demand at present, the requirement for the resin-based composite materials is also increasing.

The inventor discovers that thin-walled tubes of the resin-based composite materials processed by a centrifugal molding process at present mostly have a single layer, only one kind of resin is used to be mixed with short fibers and a curing agent for pouring, and the thin-walled tubes obtained in such a way have the defect of poor vibration reduction and sound absorption performance.

At the current stage, the requirements for the resin-based composite materials in the field of aerospace are increasing, and the single-layer thin-walled tubes of the resin-based composite materials cannot meet the requirement of high dynamic performance at present more and more.

SUMMARY

The objective of the present invention is to overcome the defects in the prior art and to provide a centrifugal molding process of a round thin-walled tube of an embedded co-cured short-fiber resin-based damping composite material. The thin-walled tube has a firmer structure and better vibration reduction and sound absorption performance, and overcomes the defects of an existing composite material thin-walled tube.

In order to achieve the above objective, the present invention uses the following technical solution:

A centrifugal molding process of an embedded co-cured short-fiber resin-based damping composite material includes the following steps:

preparing short-fiber epoxy resin with a density higher than 1.20 g/cm$^3$, short-fiber epoxy resin with a density lower than 0.90 g/cm$^3$, and a damping solution with a density of 0.95 to 1.10 g/cm$^3$;

preparing mold release agent paint, and uniformly applying the mold release agent paint into a die cavity of a mold;

preheating a die cavity wall of the mold so that moisture in the paint is sufficiently evaporated;

determining a pouring rotating speed;

sequentially pouring an outside high-density short-fiber resin layer, a middle damping layer, and an inside low-density short-fiber resin layer in the die cavity of the mold;

pressurizing and heating the die cavity of the mold so that the materials are co-cured; and opening the mold, taking out a molding part, and performing post treatment.

As a further technical solution, the short-fiber epoxy resin with the density higher than 1.20 g/cm$^3$ is prepared by mixing epoxy resin with a density higher than 1.20 g/cm$^3$ with short fibers with a length of 30 to 50 mm and a curing agent.

As a further technical solution, the short-fiber epoxy resin with the density lower than 0.90 g/cm$^3$ is prepared by mixing epoxy resin with a density lower than 0.90 g/cm$^3$ with short fibers with a length of 30 to 50 mm and a curing agent.

As a further technical solution, before the short-fiber epoxy resin with the density higher than 1.20 g/cm$^3$ and the short-fiber epoxy resin with the density lower than 0.90 g/cm$^3$ are prepared, the high-density epoxy resin and the low-density epoxy resin are heated in advance. When the temperature is raised to 100 to 120° C., the viscosity of the resin is gradually reduced. The short fibers are respectively put into the two kinds of epoxy resin. Ultrasonic vibration is used for stirring, so that the epoxy resin and the short fibers are more uniformly mixed. Then, still standing is performed. Finally, the curing agent is added, uniform stirring is performed, and pouring is performed.

As a further technical solution, when the damping material solution is prepared, weighed damping material raw rubber is put into a container. An organic solvent is added. Uniform stirring is performed. Then, sealing is performed. A mixture is put in a shade place. A raw rubber solution of the damping material can be obtained after the damping material is dissolved.

As a further technical solution, when the three kinds of above-mentioned raw materials are prepared, the consumption of the three kinds of raw materials is determined according to thickness and performance requirements of a processed thin-walled tube (it is to be noted that there needs to be some margin). The curing (or vulcanizing) temperature and time of the three kinds of raw materials are enabled to reach synchronism and consistency by regulating the type and the proportion of the curing agent added into the high-density short-fiber epoxy resin and the low-density short-fiber epoxy resin, and ingredients of a damping material. When the short-fiber epoxy resin is heated and cured, the damping material is vulcanized at the same time. Additionally, the damping material and different epoxy resin form IPN structures at interfaces.

As a further technical solution, the pouring rotating speed is determined according to the following equation:

$$n = \beta 55200/\sqrt{\gamma R}.$$

In the equation, n is a rotating speed of a casting mold, and the unit is r/min. R is an inner surface radius of the molding part, and the unit is m. $\gamma$ is a material weight density, and the unit is N/m$^3$. $\beta$ is a regulating coefficient. The equation needs to meet a requirement that the inner radius value R of the molding part shall not be greater than 1.5 m. For conditions of selecting and using different resin, $\beta$ is 0.9 to 1.4.

As a further technical solution, a pouring method of the resin layer and the damping layer is as follows:

before pouring is started, firstly rotating a tube wall at a rotating speed lower than n, where a pouring-in process of a fluid raw material needs to be completed within 5 s to 8 s;

during the first time of pouring, pouring the high-density short-fiber resin into a pouring cup, where fluid flows into the die cavity through a pouring groove, through being driven by a centrifugal force, the high-density short-fiber resin is uniformly laid into the die cavity, and the viscosity of the high-density short-fiber resin is gradually increased along with temperature reduction; after the high-density short-fiber resin is molded, starting to pour the damping material solution; after the damping material solution is uniformly distributed through being driven by the centrifugal force and an organic solvent is completely volatilized, starting to pour the low-density short-fiber resin, where the viscosity of the low-density short-fiber resin is also gradually increased along with the temperature reduction, which is similar to the high-density short-fiber resin; after all the raw material fluid is poured into the tube wall, starting to increase the rotating speed, then slowly decreasing the speed after 10 s, and when the speed is decreased to the speed n, keeping the speed unchanged; after the three kinds of raw materials are uniformly layered in the die cavity, pressurizing the rotating die cavity by an autoclave so as to avoid the occurrence of phenomena of air pores, looseness and the like among different raw materials, and heating the tube wall according to a resin curing curve, so that the three kinds of materials are co-cured into a whole at the same time to complete a workpiece manufacturing process;

after the co-curing of the three kinds of raw materials is completed, starting to reduce the temperature; when the temperature is reduced to below 60° C., relieving the pressure; and finally, when the die cavity reaches a normal pressure, stopping rotating the die cavity, and taking out the molding part, so that the molding part is cooled in the air to reach a normal temperature.

The present invention further provides a molding part, molded by the above-mentioned molding process of the co-cured short-fiber resin-based damping composite material.

The present invention further provides a thin-walled tube, molded by the molding process of the co-cured short-fiber resin-based damping composite material.

The present invention has the following beneficial effects:

Compared with an existing single-layer round thin-walled tube of the resin-based composite material, a round thin-walled tube of the "high-density resin-damping-ow-density resin" composite material processed by the centrifugal molding process of the embedded co-cured short-fiber resin-based damping composite material has a firmer structure, greater damping, a better mechanical property and better vibration reduction and sound absorption performance.

BRIEF DESCRIPTION OF THE DRAWINGS

The accompanying drawings constituting a part of the present invention are used for providing further understanding for the present invention. Exemplary embodiments of the present invention and descriptions thereof are used for explaining the present invention and do not constitute an improper limitation to the present invention.

In the figures, 1 denotes a front end cover; 2 denotes a centrifugal casting machine; 3 denotes a mold; 4 denotes a back end cover; 5 denotes a bottom plate; 6 denotes a pouring cup; 7 denotes short-fiber epoxy resin with a density higher than 1.20 g/cm$^3$; 8 denotes a damping material with a density of 0.95 to 1.10 g/cm$^3$; and 9 denotes short-fiber epoxy resin with a density lower than 0.90 g/cm$^3$.

DETAILED DESCRIPTION

It should be noted that the following detailed descriptions are all exemplary and are intended to provide a further understanding of the present invention. Unless otherwise specified, all technical and scientific terms used herein have the same meaning as commonly understood by those of ordinary skill in the art to which the present invention belongs.

It should be noted that terms used herein are only for describing specific implementations and are not intended to limit exemplary implementations according to the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

For convenience of description, the words "above", "below", "left", and "right" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

As described in the related art, there are defects in the prior art. In order to solve the above technical problems, the present invention provides a centrifugal molding process of an embedded co-cured short-fiber resin-based damping composite material.

Figure 1:
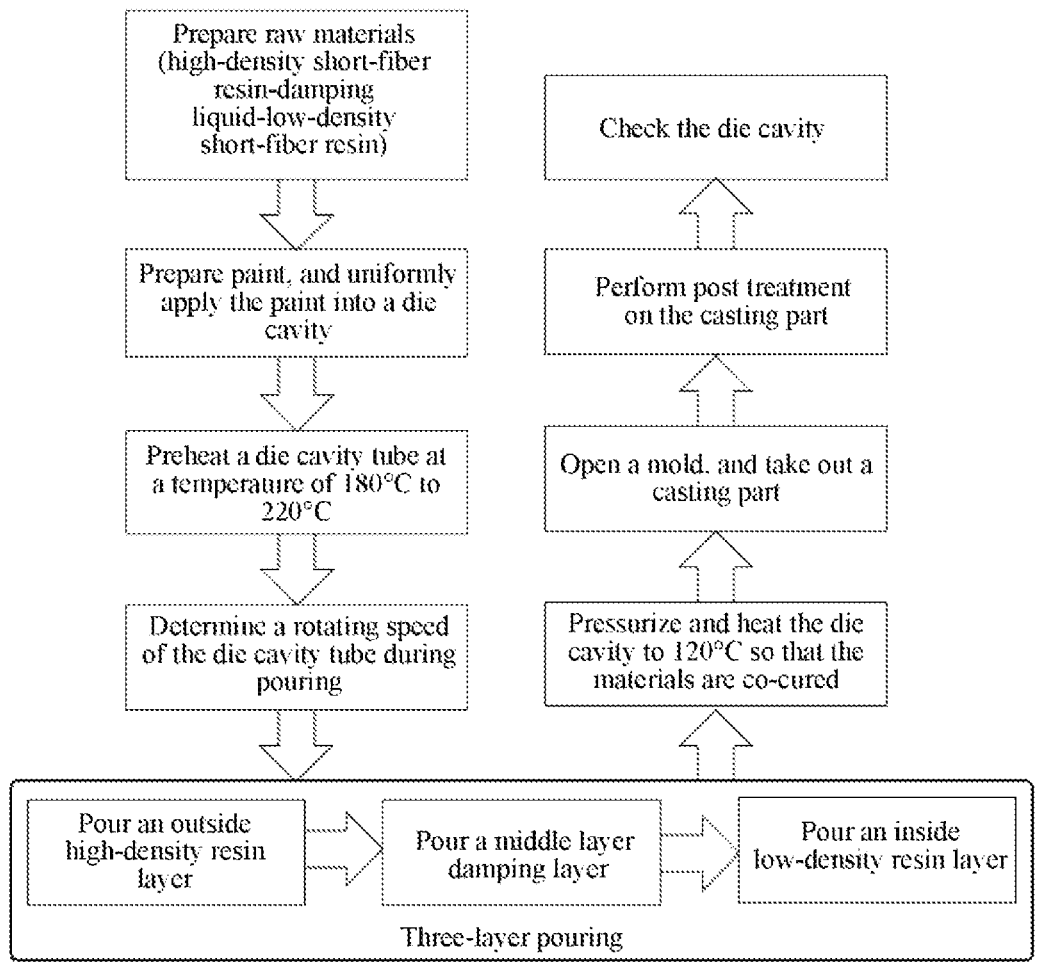
FIG. 1 is a flowchart of a centrifugal molding process of an embedded co-cured short-fiber resin-based damping composite material.

In a typical implementation of the present invention, as shown in FIG. 1, according to the centrifugal molding process of the embedded co-cured short-fiber resin-based damping composite material, a round thin-walled tube of the embedded co-cured short-fiber resin-based damping composite material of the present invention belongs to a three-layer composite material thin-walled tube. Two outside layers of the thin-walled tube are short-fiber oxygen resin with different densities, a middle layer is a damping material, and the thin-walled tube is formed through pouring by the centrifugal molding process. The round thin-walled tube of the embedded co-cured short-fiber resin-based damping composite material obtained by using the process has a firmer structure and better vibration reduction and sound absorption performance, and overcomes the defects in the prior art. The process specifically includes: preparing short-fiber epoxy resin with a density higher than 1.20 g/cm$^3$, short-fiber epoxy resin with a density lower than 0.90 g/cm$^3$, and a damping solution with a density of 0.95 to 1.10 g/cm$^3$; preparing mold release agent paint, and uniformly applying the mold release agent paint into a die cavity of a mold; preheating a die cavity wall of the mold so that moisture in the paint is sufficiently evaporated; determining a pouring rotating speed; sequentially pouring an outside high-density short-fiber resin layer, a middle damping layer, and an inside low-density short-fiber resin layer in the die cavity of the mold; pressurizing and heating the die cavity of the mold so that the materials are co-cured; and opening the mold, taking out a molding part, and performing post treatment.

Figure 2:
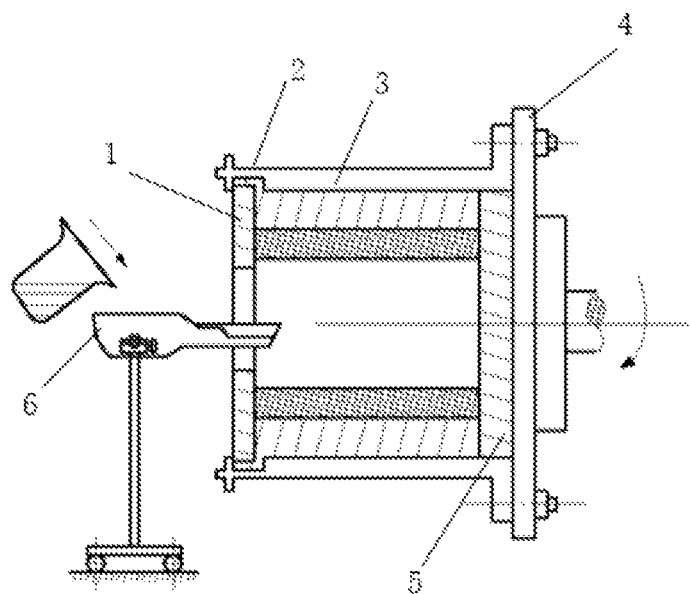
FIG. 2 is a diagram of a horizontal centrifugal molding structure.
Figure 3:
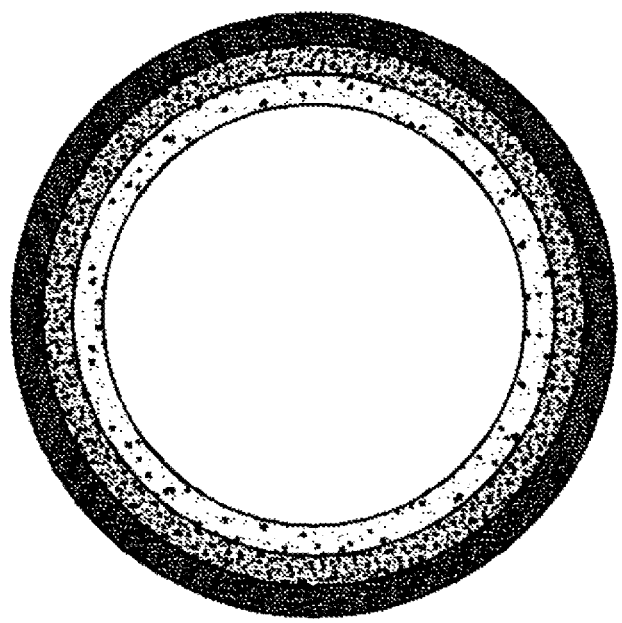
FIG. 3 is a schematic diagram of a round thin-walled tube of a "high-density resin-damping-low-density resin" composite material.
Figure 4:
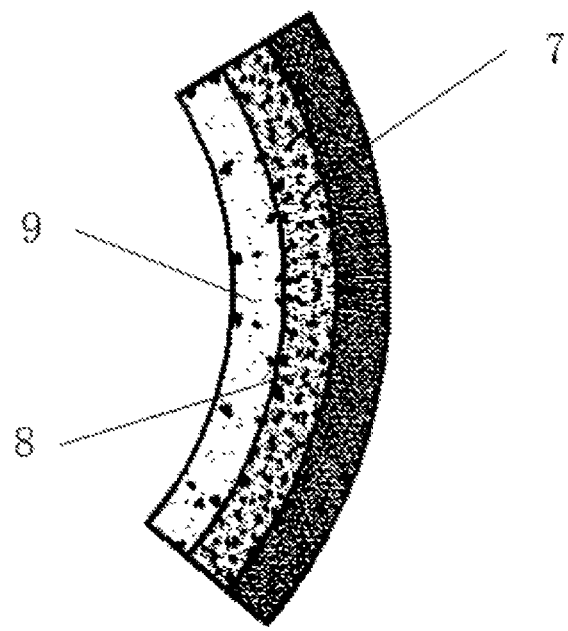
FIG. 4 is a cross-sectional view of the round thin-walled tube of the "high-density resin-damping-low-density resin" composite material.
Figure 5:
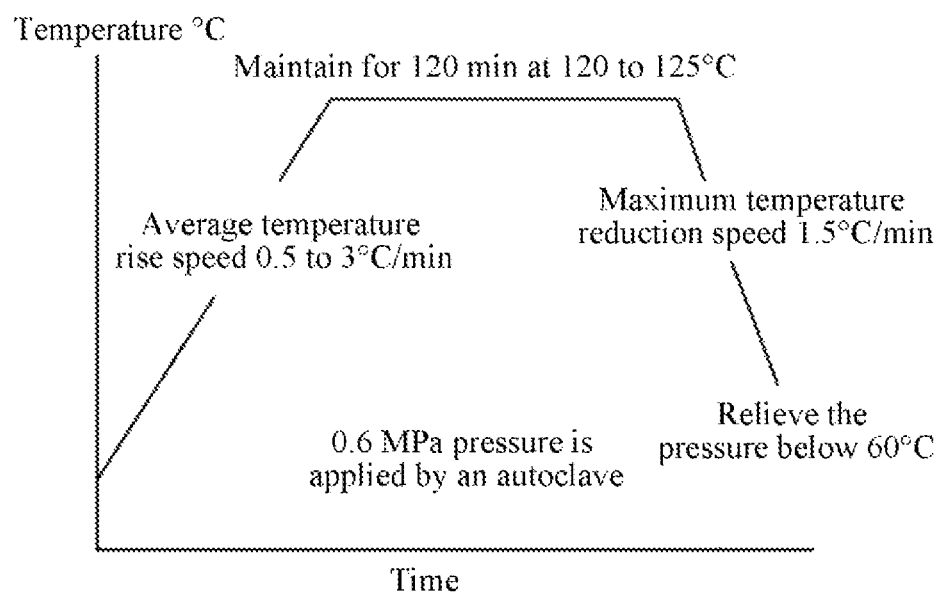
FIG. 5 is a curing process curve of an autoclave.

Specific implementations of the present invention will now be described with reference to FIG. 1 to FIG. 5, in which: FIG. 1 is a flow diagram of a centrifugal molding process of an embedded co-cured short-fiber resin-based damping composite material; FIG. 2 is a diagram of a horizontal centrifugal molding structure; FIG. 3 is a schematic diagram of a round thin-walled tube of a "high-density resin-damping-low-density resin" composite material; FIG. 4 is a cross-sectional view of the round thin-walled tube of the "high-density resin-damping-low-density resin" composite material; and FIG. 5 is a curing process curve of an autoclave.

A mold 3 used in the present embodiment includes a front end cover 1, a centrifugal casting machine 2, a back end cover 4, and a bottom plate 5. The front end cover 1, the centrifugal casting machine 2, and the back end cover 4 are combined to form a tubular structure. The bottom plate 5 is disposed inside the back end cover 4. A pouring cup 6 is used to pour the short-fiber epoxy resin.

From FIG. 1 and FIG. 2, it can be known that raw materials firstly need to be prepared in the process. Three kinds of raw materials need to be prepared in the current processing, and are respectively short-fiber epoxy resin 7 with a density higher than 1.20 g/cm$^3$ (the present embodiment uses epoxy resin 618 with a density higher than 1.20 g/cm$^3$ to be mixed with short fibers with a length of 30 to 50 mm and a curing agent), short-fiber epoxy resin 9 with a density lower than 0.90 g/cm$^3$ (the present embodiment uses epoxy resin EB6200 with a density lower than 0.80 g/cm$^3$ to be mixed with short fibers with a length of 30 to 50 mm and a curing agent), and a damping material 8 with a density of 0.95 to 1.10 g/cm$^3$ (the present embodiment dissolves damping material raw rubber into a volatile organic solvent to obtain damping material liquid). When the raw material 7 and the raw material 9 are prepared, the high-density epoxy resin and the low-density epoxy resin need to be heated in advance. When the temperature is raised to 100 to 120° C., the viscosity of the resin is gradually reduced. At the moment, the short fibers are respectively put into the two kinds of epoxy resin. Ultrasonic vibration is used for stirring, so that the epoxy resin and the short fibers are more uniformly mixed. Next, still standing is performed for about 1 h. The viscosity may be lower than $10^{-1}$ Pa·s. A mixture is in a liquid state which is the best form for pouring. Finally, the curing agent is added, uniform stirring is performed, and pouring is performed. When a damping material 8 solution is prepared, the weighed damping material 8 is put into a beaker. An organic solvent at a corresponding proportion is added and uniform stirring is performed. The present embodiment uses a tetrahydrofuran solvent. Then, sealing is performed. A mixture is put in a shade place. After dissolution, raw rubber solution of the damping material 8 can be obtained. When the three kinds of above-mentioned raw materials are prepared, the consumption of the three kinds of raw materials is determined according to thickness and performance requirements of a processed thin-walled tube. Additionally, the curing (or vulcanizing) temperature and time of the three kinds of raw materials are enabled to reach synchronism and consistency by regulating the type and the proportion of the curing agent added into the high-density short-fiber epoxy resin 7 and the low-density short-fiber epoxy resin 9, and ingredients of the damping material 8. When the short-fiber epoxy resin is heated and cured, the damping material is vulcanized at the same time. Additionally, the damping material and different epoxy resin form IPN structures at interfaces.

Then, paint is prepared. A main ingredient of the paint is a mold release agent. The paint is applied onto a mold of a tube wall and front and back end covers. The application should be uniform, so that the resin-based composite material can be enabled to easily realize mold release after being molded.

Then, the tube wall is preheated. The preheating temperature is in a range of 180° C. to 220° C. At the moment, moisture in the paint can be sufficiently evaporated to reduce generation of air pores, so that an adhesive in the paint sufficiently functions, and the paint can be prevented from being flushed to generate a tube wall and end cover sticking phenomenon. After preheating is completed, the tube wall is sealed and cooled to the room temperature.

Next, the pouring rotating speed is determined. In practical production, a rotating speed of the casting mold may be determined by an empirical equation. However, the production conditions are different, and the types of molding parts are different, so that each empirical datum has great limitation. Therefore, in practical production, the empirical data may be selected and used as reference, and may be regulated according to practical production conditions of the molding parts. The rotating speed of the casting mold is calculated according to the inner surface effective unit weight of the molding part. Regardless of the type of a fluid material, the acquisition of a centrifugal molding part with fine tissues can be ensured as long as the inner surface effective unit weight of the molding part reaches $3.4 \times 10^6$ N/m$^3$. The rotating speed of the casting mold is calculated by using a Konstantinov equation:

$$n = \beta \frac{55200}{\sqrt{\gamma R}}. \tag{1}$$

In equation (1), n is the rotating speed of the casting mold, and the unit is r/min. R is an inner surface radius of the molding part, and the unit is m. γ is a material weight density, and the unit is N/m$^3$. β is a regulating coefficient. The equation needs to meet a requirement that the inner radius value R of the molding part shall not be greater than 1.5 m. For conditions of selecting and using different resin, β is 0.9 to 1.4. The proper rotating speed n is calculated according to the equation.

In the current processing, pouring is performed in three times. In order to ensure mold filling uniformity, before the pouring is started, the tube wall is firstly rotated at a rotating speed a little lower than n. A pouring-in process of a fluid raw material needs to be completed within 5 s to 8 s. During the first time of pouring, the high-density short-fiber resin 7 is poured into the pouring cup 6. Fluid flows into the die cavity through a pouring groove. Through being driven by a centrifugal force, the high-density short-fiber resin 7 is uniformly laid into the die cavity. The viscosity of the high-density short-fiber resin 7 is gradually increased along with temperature reduction. After the high-density short-fiber resin is molded, the damping material 8 solution starts to be poured. After the damping material 8 solution is uniformly distributed through being driven by the centrifugal force and an organic solvent is completely volatilized, the low-density short-fiber resin 9 starts to be poured. The viscosity of the low-density short-fiber resin is also gradually increased along with the temperature reduction, which is similar to the high-density short-fiber resin 7. After all the raw material fluid is poured into the tube wall, the rotating speed starts to be increased. The speed is slowly decreased after 10 s. When decreased to the speed n, the speed is kept unchanged. The three kinds of materials have different densities, so that centrifugal forces applied to the three kinds of materials are different. The centrifugal force applied to the material with the higher density is greater, and the centrifugal force applied to the material with the lower density is smaller. From FIG. 3 and FIG. 4, it can be known that the high-density short-fiber resin 7 is uniformly distributed in the outermost layer, the damping material 8 is in the middle, and the low-density short-fiber resin 9 is distributed in the innermost layer. After the three kinds of raw materials are uniformly layered in the die cavity, parameters of the autoclave are set according to the co-curing process curve in FIG. 5. The rotating die cavity is pressurized so as to avoid the occurrence of phenomena of air pores, looseness and the like among different raw materials. Then, the temperature is raised to 120 to 125° C. at 0.5 to 3° C. min, and is maintained for 120 min to heat the tube wall, so that the three kinds of materials are co-cured into a whole at the same time. After the co-curing of the three kinds of raw materials is completed, the temperature of the autoclave is reduced to be below 60° C. at a temperature reduction speed equal to or less than 1.5° C. min. The pressure is relieved. The die cavity is slowly cooled. Meanwhile, the speed of the die cavity is decreased. Finally, the die cavity reaches a normal pressure and stops rotation. A workpiece is taken out, and is cooled to a normal temperature in the air. A workpiece manufacturing process is completed. For the workpiece cooled to the normal temperature, whether a defect exists or not is firstly checked, and then, the workpiece is trimmed and ground by tools such as abrasive paper and a grinding wheel.

The centrifugal molding process of the embedded co-cured short-fiber resin-based damping composite material disclosed by the present application is different from a traditional centrifugal processing process of a thin-walled tube of the resin-based composite material. Raw materials used by the process consist of three kinds of materials with different densities and include two kinds of short-fiber epoxy resin with different densities and a damping material. During centrifugal molding, the three kinds of materials are made into fluids to be respectively injected at a uniform speed in three times according to the sizes of the densities. Layering is performed by using different centrifugal forces applied to the three kinds of materials. Co-curing is performed according to a resin curing process after the three kinds of materials are stably distributed, and a tubular thin-walled part of the embedded co-cured short-fiber resin-based damping composite material with a uniform wall thickness is obtained. A workpiece processed by this method has good vibration reduction and sound isolation performance, and further has the characteristics of high quality, high density, good mechanical properties, and fewer defects.

Compared with an existing single-layer round thin-walled tube of the resin-based composite material, a round thin-walled tube of the "high-density resin-damping-low-density resin" composite material processed by the centrifugal molding process of the embedded co-cured short-fiber resin-based damping composite material has a firmer structure, greater damping, a better mechanical property and better vibration reduction and sound absorption performance, and can meet higher technical requirements.

The foregoing descriptions are merely exemplary embodiments of the present application, but are not intended to limit the present application. A person skilled in the art may make various alterations and variations to the present application. Any modification, equivalent replacement, or improvement made without departing from the spirit and principle of the present application shall fall within the protection scope of the present application.

What is claimed is:

1. A molding process of a co-cured short-fiber resin-based damping composite material, comprising the following steps:
   preparing three kinds of raw materials including: a short-fiber epoxy resin with a density higher than 1.20 g/cm$^3$, a short-fiber epoxy resin with a density lower than 0.90 g/cm$^3$, and a damping solution with a density of 0.95 to 1.10 g/cm$^3$;
   preparing a mold release agent paint, and uniformly applying the mold release agent paint into a die cavity;
   preheating a die cavity wall so that moisture in the mold release agent paint is sufficiently evaporated;
   determining a pouring rotating speed;
   pouring an outside high-density short-fiber resin layer, pouring a middle damping layer, and pouring an inside low-density short-fiber resin layer;
   pressurizing and heating the die cavity so that the three kinds of raw materials are co-cured; and
   opening a mold, taking out a molding part, and performing a post treatment,
   wherein a pouring method of the high-density and low density short-fiber resin layers and the damping layer is as follows:
   before pouring is started, firstly rotating a tube wall at a rotating speed lower than a rotating speed of a casting mold,
   during a first time of pouring, pouring a high-density short-fiber resin into a container, wherein fluid flows into the die cavity through a pouring groove, through being driven by a centrifugal force, the high-density short-fiber resin is uniformly laid into the die cavity, and a viscosity of the high-density short-fiber resin is gradually increased along with temperature reduction; after the high-density short-fiber resin is molded, starting to pour a damping material solution; after the damping material solution is uniformly distributed through being driven by the centrifugal force and an organic solvent is completely volatilized, starting to pour the low-density short-fiber resin, wherein the viscosity of the low-density short-fiber resin is also gradually increased along with the temperature reduction;
   after all raw material fluid is poured into the tube wall, starting to increase the rotating speed, then slowly decreasing the rotating speed, and when the rotating speed is decreased to the rotating speed of the casting mold, keeping the rotating speed unchanged;
   after the three kinds of raw materials are uniformly layered in the die cavity, pressurizing a rotating die cavity, and heating the tube wall according to a resin curing curve, so that the three kinds of materials are co-cured into a whole at the same time to complete a workpiece manufacturing process; and
   after the co-curing of the three kinds of raw materials is completed, starting to reduce the temperature; when the temperature is reduced to below 60° C., relieving a pressure thereof; and finally, when the die cavity reaches a normal pressure, stopping rotating the die cavity, and taking out the molding part, so that the molding part is cooled in the air to reach a normal temperature.

2. The molding process of a co-cured short-fiber resin-based damping composite material according to claim 1, wherein the short-fiber epoxy resin with the density higher than 1.20 g/cm$^3$ is prepared by mixing an epoxy resin with a density higher than 1.20 g/cm$^3$ with short fibers with a length of 30 to 50 mm and a curing agent.

3. The molding process of a co-cured short-fiber resin-based damping composite material according to claim 1, wherein the short-fiber epoxy resin with the density lower than 0.90 g/cm$^3$ is prepared by mixing an epoxy resin with a density lower than 0.90 g/cm$^3$ with short fibers with a length of 30 to 50 mm and a curing agent.

4. The molding process of a co-cured short-fiber resin-based damping composite material according to claim 2, wherein before the short-fiber epoxy resin with the density higher than 1.20 g/cm$^3$ and the short-fiber epoxy resin with the density lower than 0.90 g/cm$^3$ are prepared, the epoxy resin is heated in advance; when a temperature is raised to 100 to 120° C., a viscosity of the epoxy resin is gradually reduced, the short fibers are respectively put into the two kinds of epoxy resin; ultrasonic vibration is used for stirring, so that the epoxy resin and the short fibers are more uniformly mixed; then, still standing is performed; and finally, the curing agent is added, uniform stirring is performed, and pouring is performed.

5. The molding process of a co-cured short-fiber resin-based damping composite material according to claim 1, wherein when the damping material solution is prepared, weighed damping material raw rubber is put into a container; an organic solvent is added; uniform stirring is performed; then, sealing is performed; a mixture is put in a shade place; and a raw rubber solution of the damping material is obtained after the damping material is dissolved.

6. The molding process of a co-cured short-fiber resin-based damping composite material according to claim 1, wherein when the three kinds of raw materials are prepared, the consumption of the three kinds of raw materials is determined according to thickness and performance requirements of a processed thin-walled tube, and it is to be noted that there needs to be some margin; the curing or vulcanizing temperature and time of the three kinds of raw materials are enabled to reach synchronism and consistency by regulating the type and the proportion of the curing agent added into the high-density short-fiber epoxy resin and the low-density short-fiber epoxy resin, and ingredients of a damping material; when the short-fiber epoxy resin is heated and cured, the damping material is vulcanized at the same time; and the damping material and different epoxy resin form interpenetrating polymer network structures at interfaces.

7. The molding process of a co-cured short-fiber resin-based damping composite material according to claim 1, wherein the pouring rotating speed is determined according to the following equation:

$$n = \beta \frac{55200}{\sqrt{\gamma R}},$$

wherein n is the rotating speed of a casting mold, and a unit of n is r/min; R is an inner surface radius of the molding part, and a unit of R is m; $\gamma$ is a material weight density, and a unit of $\gamma$ is N/m$^3$; $\beta$ is a regulating coefficient; and the equation needs to meet a requirement so that the inner surface radius value R of the molding part is not greater than 1.5 m, wherein for conditions of selecting and using different resin, $\beta$ is 0.9 to 1.4.

* * * * *